(12) United States Patent
Russell et al.

(10) Patent No.: US 7,734,645 B2
(45) Date of Patent: Jun. 8, 2010

(54) COMPUTERIZED METHOD, SYSTEM AND PROGRAM PRODUCT FOR GENERATING A DATA MINING MODEL

(75) Inventors: Feng-wei Chen Russell, Cary, NC (US); Ameet M. Kini, Sterling, VA (US); John A. Medicke, Jr., Raleigh, NC (US); Betsy M. Plunket, Raleigh, NC (US); Ashish Sureka, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 11/923,862

(22) Filed: Oct. 25, 2007

(65) Prior Publication Data

US 2008/0046426 A1 Feb. 21, 2008

Related U.S. Application Data

(62) Division of application No. 10/719,820, filed on Nov. 21, 2003, now Pat. No. 7,349,919.

(51) Int. Cl.
G06F 7/00 (2006.01)
G06F 17/00 (2006.01)

(52) U.S. Cl. ...................... 707/776; 707/810
(58) Field of Classification Search .......... 707/796, 707/804, 810, 759, 776; 706/12; 717/104
See application file for complete search history.

(56) References Cited

U.S. PATENT DOCUMENTS

| | | | |
|---|---|---|---|
| 5,526,281 A | 6/1996 | Chapman et al. |
| 5,526,293 A | 6/1996 | Mozumder et al. |
| 5,621,652 A | 4/1997 | Eakin |
| 5,680,590 A | 10/1997 | Parti |
| 5,692,107 A | 11/1997 | Simoudis et al. |
| 5,875,284 A | 2/1999 | Watanabe et al. |
| 6,185,549 B1 | 2/2001 | Rastogi et al. |
| 6,393,387 B1 | 5/2002 | Adriaans et al. |
| 6,456,989 B1 | 9/2002 | Kawamura et al. |
| 6,519,602 B2 | 2/2003 | Sundaresan et al. |

(Continued)

FOREIGN PATENT DOCUMENTS

GB 2227106 A 7/1990

(Continued)

OTHER PUBLICATIONS

Huang et al., "A Systematic Method to Design a Fuzzy Data Mining Model," IEEE International Conference on Fuzzy Systems Proceedings, vol. 2, 2002, pp. 896-901.

(Continued)

*Primary Examiner*—Hung T Vy

(57) ABSTRACT

A computerized method, system and program product for generating a data mining model. A user can provide objectives for the model and sample data to train, validate, and test the model. A rules system can automatically select a set of algorithms based on the objectives and/or sample data. A plurality of datasets can also be created from the sample data. Using the datasets, the set of algorithms can be optimized for the particular data on which it is intended to be used. The data mining model can then be generated from the optimized set of algorithms.

5 Claims, 4 Drawing Sheets

U.S. PATENT DOCUMENTS

| | | | |
|---|---|---|---|
| 6,532,412 B2 | 3/2003 | Adibhatla et al. | |
| 6,539,300 B2 | 3/2003 | Myr | |
| 6,553,366 B1 | 4/2003 | Miller et al. | |
| 6,611,829 B1 | 8/2003 | Tate et al. | |
| 6,687,695 B1 | 2/2004 | Miller et al. | |
| 6,704,717 B1 | 3/2004 | Tate | |
| 6,799,181 B2 * | 9/2004 | Vishnubhotla | 707/100 |
| 7,092,941 B1 | 8/2006 | Campos | |
| 7,194,301 B2 * | 3/2007 | Jenkins et al. | 607/2 |
| 7,349,919 B2 * | 3/2008 | Russell et al. | 707/102 |
| 7,444,308 B2 * | 10/2008 | Guyon et al. | 706/12 |
| 7,542,947 B2 * | 6/2009 | Guyon et al. | 706/12 |

FOREIGN PATENT DOCUMENTS

| | | |
|---|---|---|
| JP | 10065159 A | 3/1998 |
| SU | 903873 | 2/1982 |

OTHER PUBLICATIONS

Prado et al., "Accuracy Tuning on Combinatorial Neural Model," Third Pacific-Asia Conference, PAKDD-99, Beijing, China, Apr. 26-28, 1999, pp. 247-251.

* cited by examiner

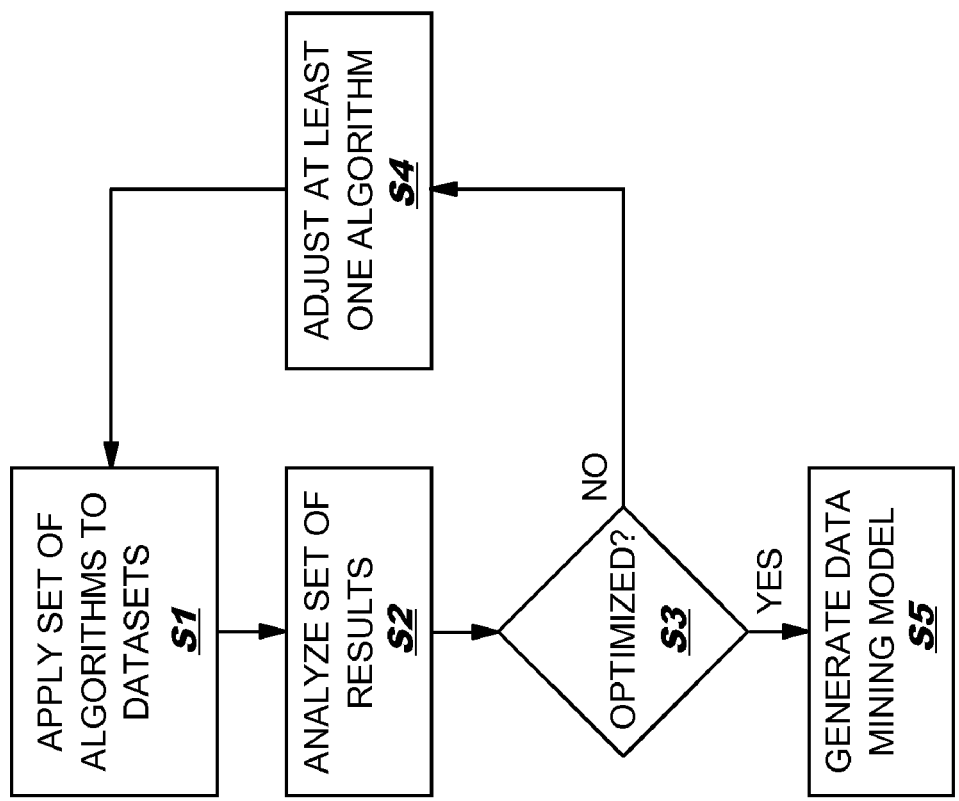

COMPUTERIZED METHOD, SYSTEM AND PROGRAM PRODUCT FOR GENERATING A DATA MINING MODEL

REFERENCE TO PRIOR APPLICATION

The current application is a divisional application of U.S. Utility patent application Ser. No. 10/719,820, which was filed on 21 Nov. 2003 now U.S. Pat. No. 7,349,919, and which is hereby incorporated by reference.

BACKGROUND OF THE INVENTION

1. Technical Field

The invention relates generally to generating a data mining model, and more specifically, to a computerized method, system and program product that generate an optimized data mining model based on objectives for the data mining model.

2. Related Art

As businesses increasingly rely upon computer technology to perform essential functions, data mining is rapidly becoming vital to business success. Specifically, many businesses gather various types of data about the business and/or its customers so that operations can be gauged and optimized. Typically, a business will gather data into a database or the like and then utilize a data mining tool to mine the data.

Generation of a data mining model is an iterative and complex process that requires a great deal of knowledge about data distribution, data characteristics, mining functions, mining algorithm parameters, and the like. Typically, a business client will set objectives for the data mining model, an information technology (IT) specialist that understands the data distribution will generate sample data, and a mining expert will select a data mining model defined by a mining function, algorithm, and tuning parameters. In order to meet the stated objectives, the sample data can be fitted to the data mining model by the mining expert. For example, the mining expert may adjust one or more tuning parameters to modify the algorithm.

The current process for generating a data mining model is inefficient and prone to error for several reasons. For example, various individuals (e.g., business client, IT specialist, mining expert) must provide input and perform actions at various stages of the development of the data mining model. When human interaction is required, a misunderstanding becomes more likely, which can result in an erroneous model that does not assist, and may even impede, the business from exploiting a potential revenue stream. Further, the extensive amount of human actions make the process time consuming, inconsistent from model to model, and costly.

As a result, a need exists for a computerized solution for generating a data mining model. In particular, a need exists for a computerized method, system and program product for generating a data mining model based on objectives for the data mining model.

SUMMARY OF THE INVENTION

The invention provides a computerized solution for generating a data mining model. Specifically, under the present invention, a user can provide objectives for the model and sample data to train, validate, and test the model. The invention can automatically select a set (one or more) of algorithms based on the objectives, and create a plurality of datasets from the sample data. Using the datasets, the set of algorithms can be optimized for the particular data on which it is intended to be used. The data mining model can then be generated from the optimized set of algorithms. For example, a set of standard query language (SQL) functions can be generated based on the optimized set of algorithms. The data mining model can be generated using the set of SQL functions, and can be stored in a database for future selection, use, and/or optimization. As a result, the invention provides an improved solution for generating a data mining model in which the amount of human interaction and decision-making is greatly reduced, resulting in a data mining model that is generated more efficiently, consistently, and is less likely to suffer from one or more human-caused defects.

A first aspect of the invention provides a computerized method of generating a data mining model, the method comprising: obtaining objectives for the data mining model; automatically selecting a set of algorithms based on the objectives; obtaining sample data; creating a plurality of datasets from the sample data; optimizing the set of algorithms using the plurality of datasets; and generating the data mining model based on the optimized set of algorithms.

A second aspect of the invention provides a computerized method of generating a data mining model, the method comprising: obtaining a set of algorithms and a plurality of datasets; applying the set of algorithms to the plurality of datasets; analyzing a set of results for the applying step; adjusting at least one algorithm based on the set of results; applying the adjusted set of algorithms to the plurality of datasets; and generating the data mining model based on the adjusted set of algorithms.

A third aspect of the invention provides a system for generating a data mining model, the system comprising: a dataset system for obtaining a plurality of datasets; a rules system for obtaining a plurality of algorithms; an optimization system for optimizing the set of algorithms using the plurality of datasets; and a model system for generating the data mining model based on the optimized set of algorithms.

A fourth aspect of the invention provides a program product stored on a recordable medium for generating a data mining model, which when executed comprises: program code for generating a plurality of datasets from sample data; program code for selecting a set of algorithms based on objectives for the data mining model; program code for optimizing the set of algorithms using the plurality of datasets; and program code for generating the data mining model based on the optimized set of algorithms.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings in which:

FIG. 4 shows illustrative method steps for generating the data mining model according to yet another embodiment of the invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a computerized solution for generating a data mining model. Specifically, under the present invention, a user can provide objectives for the model and sample data to train, validate, and test the model. The invention can automatically select a set (one or more) of algorithms based on the objectives, and create a plurality of datasets from the sample data. Using the datasets, the set of algorithms can be optimized for the particular data on which it is intended to be used. The data mining model can then be generated from the optimized set of algorithms. For example, a set of standard query language (SQL) functions can be generated based on the optimized set of algorithms. The data mining model can be generated using the set of SQL functions, and can be stored in a database for future selection, use, and/or optimization. As a result, the invention provides an improved solution for generating a data mining model in which the amount of human interaction and decision-making is greatly reduced, resulting in a data mining model that is generated more efficiently, consistently, and is less likely to suffer from one or more human-caused defects.

Figure 1:
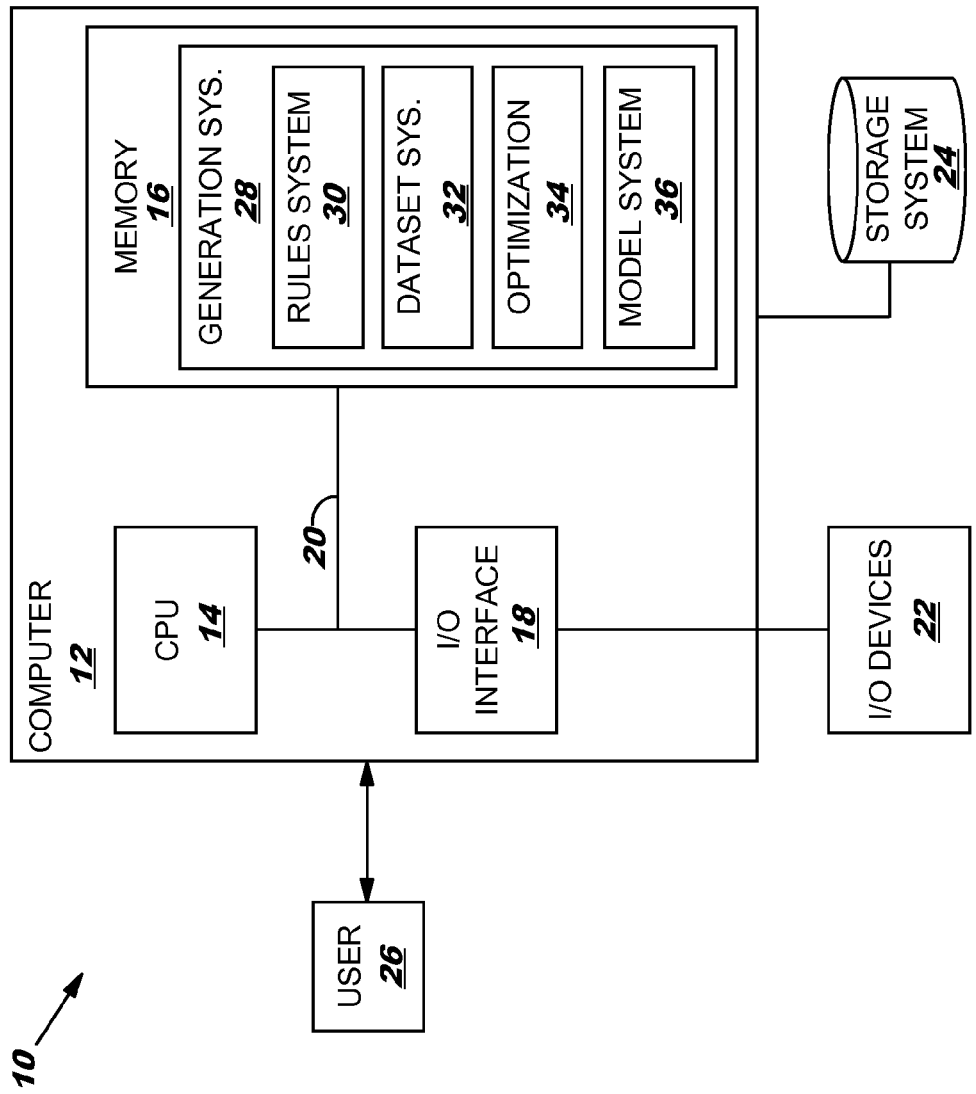
FIG. 1 shows an illustrative system for generating a data mining model according to one embodiment of the invention.

Turning to the drawings, FIG. 1 shows an illustrative system 10 for generating a data mining model. As shown, computer 12 generally includes a central processing unit (CPU) 14, memory 16, input/output (I/O) interface 18, bus 20, and external I/O devices/resources 22. To this extent, computer 12 may comprise any type of general purpose/specific-use computerized system (e.g., a mobile phone, a handheld computer, a personal digital assistant, a portable (laptop) computer, a desktop computer, a workstation, a server, a mainframe computer, etc.).

CPU 14 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Further, computer 12 may include a storage system 24 that can comprise any type of data storage for providing storage for information necessary to carry out the invention as described below. As such, storage system 24 may include one or more storage devices, such as a magnetic disk drive or an optical disk drive. Moreover, similar to CPU 14, memory 16 and/or storage system 24 may reside at a single physical location, comprising one or more types of data storage, or be distributed across a plurality of physical systems in various forms. Further, memory 16 and/or storage system 24 can include data distributed across, for example, a LAN, WAN or a storage area network (SAN) (not shown).

I/O interface 18 may comprise any system for exchanging information to/from external device(s). I/O devices 22 may comprise any known type of external device, including speakers, a CRT, LED screen, handheld device, keyboard, mouse, voice recognition system, speech output system, printer, monitor/display, facsimile, pager, etc. It is understood, however, that if computer 12 is a handheld device or the like, a display could be contained within computer 12, and not as an external I/O device 22 as shown. Bus 20 provides a communication link between each of the components in computer 12 and likewise may comprise any known type of transmission link, including electrical, optical, wireless, etc. In addition, although not shown, additional components, such as cache memory, communication systems, system software, etc., may be incorporated into computer 12.

Shown stored in memory 16 is a generation system 28 that generates a data mining model. To this extent, generation system 28 is shown including a rules system 30 that can obtain a set of algorithms for the data mining model, and a dataset system 32 that can obtain datasets for generating the data mining model. Using the datasets, optimization system 34 can optimize the set of algorithms, and model system 36 can generate the data mining model based on the optimized set of algorithms. While the various systems are shown implemented as part of generation system 28, it is understood that some or all of the systems can be implemented independently, combined, and/or stored in memory for one or more separate computers 12 that communicate over a network.

User 26 operates computer 12 and generation system 28 to request generation of a data mining model. To this extent, user 26 can provide objectives for the data mining model. For example, user 26 can specify that the data mining model is desired to find a market niche, provide a high level view of customer segments, locate fraud patterns, classify customers, analyze the performance of a business sector, or the like. Based on the objectives provided by user 26, rules system 30 can automatically select a set of algorithms for the data mining model. Alternatively, user 26 could provide the set of algorithms to rules system 30. For example, user 26 could select a data mining model that was previously defined. In this case, the data mining model would have a set of algorithms that can be used as a starting point for generating the new data mining model.

Figure 2:
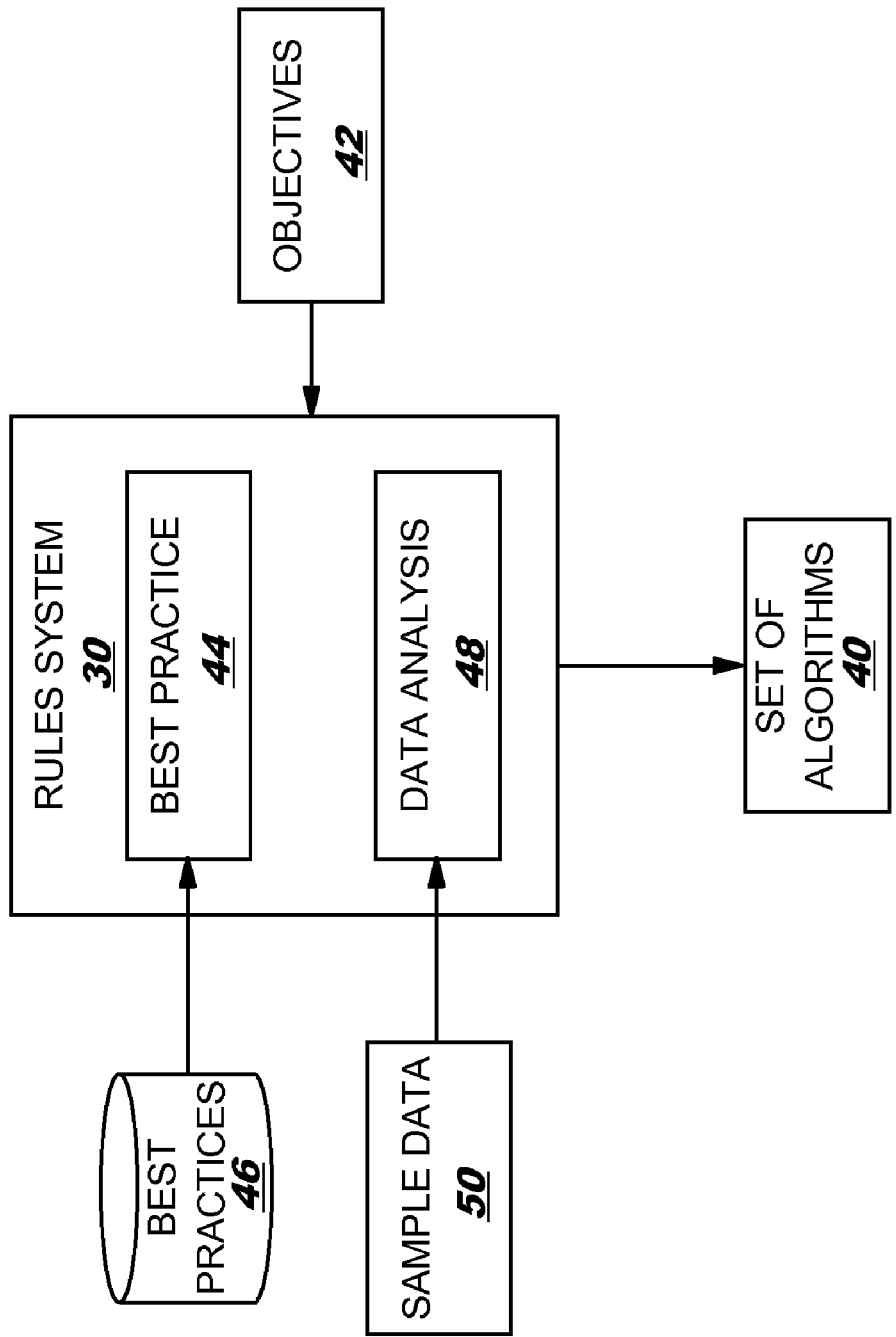
FIG. 2 shows a more detailed rules system according to another embodiment of the invention.

FIG. 2 shows a more detailed view of rules system 30 automatically selecting a set of algorithms 40 based on objectives 42 provided by user 26 (FIG. 1). In one embodiment, rules system 30 includes a best practice system 44 that consults a best practices database 46 to select set of algorithms 40. Best practices database 46 can include, for example, rules that match a particular objective 42 with a corresponding algorithm 40 and/or tuning parameter for an algorithm 40 based on the "best practice." The best practice can be based on research. For example, objectives 42 may specify that the data mining model is to perform classification. As a result, a rule in best practices database 46 can designate a set of algorithms 40 that correspond to classifying data. Further, objectives 42 may indicate that the data mining model is to be translated into one or more standard query language (SQL) statements or a natural query language. In this case, a rule can designate a set of algorithms 40 for classifying data using decision trees, which can be readily understood and/or translated into SQL. Further, the set of algorithms 40 for decision trees can include, for example, an algorithm that selects a decision tree having a smallest number of leaves when all other aspects of two or more trees are substantially the same (e.g., prediction accuracy, type of tests, etc.).

One or more rules in best practices database 46 can also be based on feedback from user 26 (FIG. 1). For example, user 26 may specify an objective 42 of finding market niches. In this case, based on research, a rule may indicate that an algorithm 40 should have a parameter corresponding to the a maximum number of clusters that can be found set to a high value (e.g., ten). Over time, feedback from previous data mining models generated for user 26 may indicate that the parameter should have a different value (e.g., eight) from that indicated by research for the algorithm 40 to work more efficiently. As a result, the rule in best practices database 46 can be modified to new value rather than the value indicated by research.

A best practice rule can also be based on one or more data characteristics. For example, best practices database 46 could include a rule indicating that when data has a lot of noise, a neural classification algorithm should be used due to its high tolerance to noisy data. In this case, user 26 (FIG. 1) can specify if the data includes a lot of noise. When the data includes a lot of noise, best practice system 44 could select an algorithm 40 that uses neural classification. Otherwise, an alternate classification algorithm that may be more efficient could be selected.

In one embodiment, sample data 50 may also be provided to rules system 30. In this case, rules system 30 can include a data analysis system 48 that analyzes one or more attributes of sample data 50. Alternatively, sample data 50 could be generated by an information technology (IT) specialist and provided to data analysis system 48. Still further, data analysis system 48 could be provided with meta data that describes the formatting of sample data 50, rather than any entries that comprise sample data 50.

In any event, data analysis system 48 can analyze one or more attributes of sample data 50, and provide the analysis to best practice system 44 for consideration in selecting set of algorithms 40. For example, objectives 42 may require a set of algorithms 40 to implement a clustering mining algorithm. Data analysis system 48 can analyze sample data 50 to determine the type of variables (e.g., categorical, numeric, etc.) and the number of columns for each entry in sample data 50 and provide this analysis to rules system 30. When the analysis indicates that sample data 50 includes a large number of categorical variables, best practices database 46 can include a rule that selects a set of algorithms 40 that implement a demographic clustering algorithm, since research indicates that this type of algorithm works well with categorical and/or non-numerical data. Further, based on the number of columns, a rule can adjust a parameter that that is used to determine if two entries are similar. For example, when entries have a small number of columns (e.g., four), then the parameter can be set to require a high similarity (e.g., >=75% of columns match). However, when entries have a large number of columns (e.g., twenty), then the parameter can be set to a lower similarity (e.g., >=50% of columns match).

Figure 3:
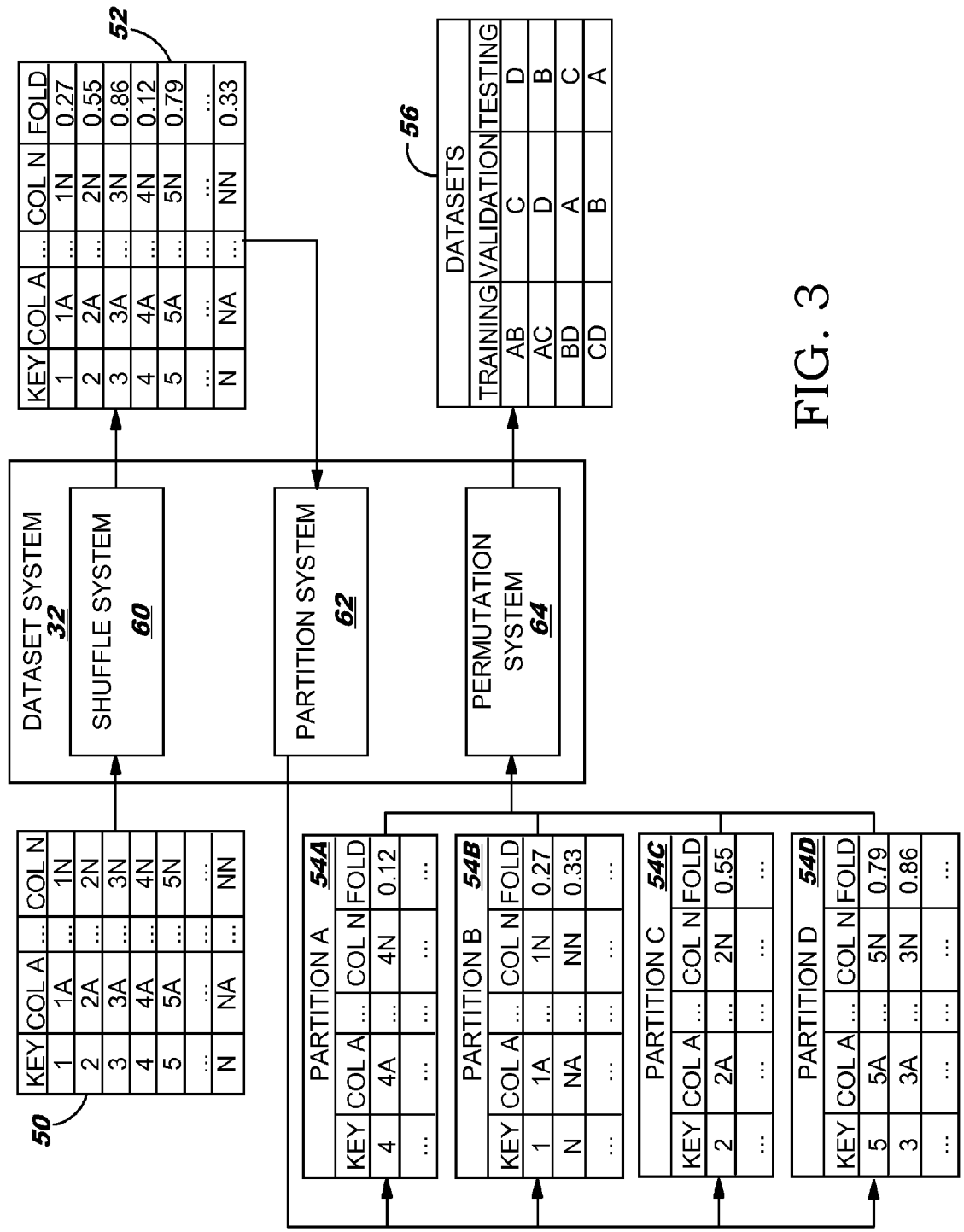
FIG. 3 shows a more detailed dataset system according to still another embodiment of the invention.

Once a set of algorithms 40 has been selected, sample data 50 can also be used to optimize set of algorithms 40. To this extent, sample data 50 can be provided to dataset system 32 (FIG. 1), which can obtain a plurality of datasets that include sample data 50. Some or all of the datasets can be provided to dataset system 32 by user 26 (FIG. 1), or can created from sample data 50. FIG. 3 shows a more detailed view of dataset system 32 that creates a plurality of datasets 56 from sample data 50. As shown, sample data 50 can comprise any number of entries, and each entry can include any number of columns. For example, sample data 50 can comprise some or all of the entries in a database or one or more tables in a database that is stored on storage system 24 (FIG. 1) and selected by user 26. In either case, the database could have millions of entries, while only a few thousand are desired for use as sample data 50. Consequently, dataset system 32 can select the desired entries by, for example, selecting the first few thousand entries, selecting entries from multiple locations in the table, etc. Further, only a subset of the columns for each entry could be desired for use as sample data 50. To this extent, dataset system 32 could store the selected sample data 50 in a temporary database or the like for use in generating the data mining model.

Since sample data 50 may be stored and/or selected in a non-random fashion (e.g., chronological order), dataset system 32 can include a shuffle system 60 that shuffles sample data 50 to reduce the chance that skewed results will be obtained due to sample data 50 having a particular order. Shuffle system 60 can shuffle sample data 50 using any solution. In one embodiment, shuffle system 60 generates shuffled sample data 52 by adding a new "fold" data column to the end of each entry. A value for the fold data column can be generated by a random number selected from a predefined range of values (e.g., zero to one). The random numbers can then be used to resort the entries (e.g., lowest to highest).

Shuffled sample data 52 can be provided to a partition system 62 for placement into a plurality of partitions 54A-D. A user 26 (FIG. 1) can specify a number of partitions 54A-D that should be used. Alternatively, the same number of partitions 54A-D can always be used by partition system 62. In any event, the range of values for the random numbers can be divided into roughly equal sub-ranges corresponding to the number of partitions, and each partition 54A-D can be assigned to a unique sub-range. For example, as shown in FIG. 3, four partitions 54A-D and a range of random values from zero to one can be used. As a result, partition 54A can be assigned the range 0-0.25, partition 54B can be assigned 0.25-0.50, partition 54C can be assigned 0.50-0.75, and partition 54D can be assigned 0.75-1. Subsequently, each entry in shuffled sample data 52 is placed in the partition 54A-D that is assigned to the range that includes the randomly generated fold value. The entries can be placed into each partition 54A-D in the order that they appear in sample data 50. Alternatively, as shown for partition 54D, the fold value can be used to sort the entries (e.g., lowest to highest), thereby providing further randomization of sample data 50.

Partitions 54A-D can be provided to permutation system 64 for inclusion in one of a plurality of datasets 56. Datasets 56 can include a training dataset that is used for training set of algorithms 40 (FIG. 2), a validation dataset that is used to validate a trained set of algorithms 40, and a testing dataset that is used to test the trained set of algorithms 40. When four partitions 54A-D are generated by partition system 62, permutation system 64 can select two partitions 54A-B for the training dataset, one partition 54C for the validation dataset, and one partition 54D for the testing dataset. Further, permutation system 64 can permute partitions 54A-D until each partition 54A-D is included in at least one training dataset. By including each partition 54A-D in at least one training dataset, the likelihood of any contamination of canonical variants and canonical correlations by sample-specific variance components is reduced. Further, as datasets 56 illustrate, permutation system 64 can select partitions 54A-D for training, validation, and testing datasets 56 in a manner that each partition 54A-D is also used at least once for validation and at least once for testing. While datasets 56 are shown including four permutations of partitions 54A-D, it is understood that any number of permutations could be implemented. For example, each combination of partitions 54A-D could be permuted.

The plurality of datasets 56 can be used by, for example, optimization system 34 (FIG. 1) to optimize set of algorithms 40 (FIG. 2). FIG. 4 shows illustrative method steps that can be used to optimize set of algorithms 40. In step S1, set of algorithms 40 can be applied to one or more datasets 56 to generate a set of results. In step S2, the set of results can be analyzed. For example, the set of results can be compared to objectives 42 (FIG. 2) of the data mining model to determine the effectiveness of set of algorithms 40. In particular, the set of results can be analyzed to determine the extent that they deviate from objectives 42. In step S3, it is determined whether the set of algorithms appears to be optimized. For example, if the set of results perfectly matches objectives 42, then set of algorithms 40 is optimized, and no additional iterations are required.

However, if the set of results differs in one or more aspects, then set of algorithms 40 performed less than optimally. In this case, flow can proceed to step S4, wherein one or more of set of algorithms 40 is adjusted. For example, each algorithm 40 can be configured by one or more parameters. Each parameter can include a range of suggested values, and can be assigned an initial value based on, for example, a rule in best practices database 46 (FIG. 2). A first application of algorithm 40 to sample datasets 56 (FIG. 3) can use the initial values and obtain a set of results. Subsequently, the set of results may indicate that the algorithm should perform better if one or more parameter values are changed. As a result, the parameter value can be adjusted accordingly and the set of algorithms can be re-applied to datasets 56 in step S1.

As noted previously, when the set of results matches objectives 42 (FIG. 2) for the data mining model, set of algorithms 40 (FIG. 2) has been optimized. Alternatively, in step S3, it may be determined that an adjusted set of algorithms 40 produced a set of results that deviates more from objectives 42 than a previous set of algorithms 40. Once all reasonable variations for set of algorithms 40 have been attempted, the best performing set of algorithms 40 can be provided as the optimized set of algorithms 40. Alternatively, when multiple sets of algorithms 40 provide similar performance, sets of algorithms 40 can be provided to user 26 (FIG. 1), who can select a desired set of algorithms 40 to use as the optimized set of algorithms 40.

In any event, flow can proceed to step S5, in which the data mining model can be generated by model system 36 (FIG. 1) based on the optimized set of algorithms 40 (FIG. 2). Generation of the data mining model can comprise, for example, translating set of algorithms 40 into one or more standard query language (SQL) statements. For example, the data mining model may have found several market niches. A SQL statement can be generated for each market niche to obtain the entries that belong within it. Once generated, model system 36 can store the data mining model for future use and/or reference. For example, the data mining model can be stored as a character large object (CLOB) in a database. The data mining model can then be selected by a user 26 (FIG. 1) for execution and/or modification at a later time.

In addition to generating the data mining model, model system 36 can provide optimized set of algorithms 40 (FIG. 2) to rules system 30 (FIG. 2). Rules system 30 can analyze optimized set of algorithms 40 and update one or more rules in best practices database 46 (FIG. 2) based on set of algorithms 40. For example, if a current rule in best practices database 46 states that a group of related parameters should have a certain set of values, however the optimized set of algorithms 40 has a different set of values, then the rule can be updated to reflect the new set of values.

It is understood that the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer (e.g., a finite state machine), containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various embodiments of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A computerized method of generating a data mining model, the method comprising:
   obtaining a set of algorithms;
   automatically generating a plurality of datasets from sample data, wherein the automatically generating includes:
   changing an order of entries in the sample data in a random fashion;
   placing each of the entries into one of a plurality of partitions; and
   creating the plurality of datasets based on the plurality of partitions, each dataset including at least one of the plurality of partitions;
   optimizing the set of algorithms using the plurality of datasets, the optimizing including:
   applying the set of algorithms to the plurality of datasets;
   analyzing a set of results for the applying;
   adjusting at least one algorithm based on the set of results; and
   applying the adjusted set of algorithms to the plurality of datasets; and
   generating the data mining model based on the optimized set of algorithms, wherein the data mining model includes a set of SQL statements.

2. The method of claim 1, wherein the obtaining includes:
   obtaining objectives for the data mining model; and
   automatically selecting the set of algorithms based on the objectives.

3. The method of claim 1, wherein the plurality of datasets comprises a permutation of the partitions, the automatically generating further including repeating the creating to create a plurality of permutations of the partitions.

4. The method of claim 3, wherein each permutation of the partitions includes a training dataset and each partition is included in the training dataset for at least one of the plurality of permutations, and wherein each applying includes training the set of algorithms using at least one training dataset.

5. The method of claim 4, wherein each permutation of the partitions further includes a validation dataset and a testing dataset and each partition is included in the validation dataset for at least one of the plurality of permutations and the testing dataset for at least one of the plurality of permutations, and wherein the applying the adjusted set of algorithms further includes:
   validating the adjusted set of algorithms using at least one validation dataset; and
   testing the adjusted set of algorithms using at least one testing dataset.

* * * * *